United States Patent [19]
Inoue

[11] Patent Number: 6,158,525
[45] Date of Patent: Dec. 12, 2000

[54] MAIN FRAME STRUCTURE AND STEERING CASE OF CONSTRUCTION EQUIPMENT

[75] Inventor: Hirotsugu Inoue, Hirakata, Japan

[73] Assignee: Komatsu Ltd., Tokyo, Japan

[21] Appl. No.: 09/349,247

[22] Filed: Jul. 8, 1999

[30] Foreign Application Priority Data

Jul. 10, 1998 [JP] Japan ................................. 10-211790
Jul. 23, 1998 [JP] Japan ................................. 10-222464

[51] Int. Cl.[7] ............................... E02F 9/08; E02F 9/06; B62D 21/18
[52] U.S. Cl. ........................................ 172/811; 172/776
[58] Field of Search ................................... 172/811, 776, 172/825, 824, 828

[56] References Cited

U.S. PATENT DOCUMENTS 5,263,822 11/1993 Fujio ...................................... 418/55.4

FOREIGN PATENT DOCUMENTS 62-24583 5/1987 Japan .
2-88877 7/1990 Japan .

*Primary Examiner*—Christopher J. Novosad
*Attorney, Agent, or Firm*—Armstrong, Westerman, Hattori, McLeland & Naughton

[57] ABSTRACT

The present invention makes it possible to increase the inner width between left and right main frames without increasing the entire width of a vehicle, to reduce the weight, and to improve the productivity. For this purpose, in a main frame structure for construction equipment including a pair of left and right main frames, a cross member connecting the front portions of the pair of left and right main frames and vertically swingably supporting an equalizer bar for coupling a pair of left and right track frames, and lift cylinder supporting elements rotatably supporting one end of a lift cylinder for raising and lowering a working machine frame mounted with a working machine, the pair of left and right main frames (1a, 1b) are respectively composed of a straight plate provided along a longitudinal direction of a vehicle body, and each of the lift cylinder supporting elements is integrally fixed on the outside in a lateral direction of the vehicle body, of the pair of left and right main frames (1a, 1b).

18 Claims, 16 Drawing Sheets

MAIN FRAME STRUCTURE AND STEERING CASE OF CONSTRUCTION EQUIPMENT

TECHNICAL FIELD

The present invention relates to construction equipment and, more particularly, to a main frame structure and a steering case of a bulldozer.

BACKGROUND ART

Conventionally, lift cylinder supporting elements for supporting one end portion of a lift cylinder for vertically raising and lowering a working machine (a blade in a bulldozer) are provided at the front portions of a pair of left and right main frames composing a main part of a vehicle body of construction equipment (more particularly, a bulldozer). The pair of left and right main frames are connected by a cross member vertically swingably supporting an equalizer bar for coupling a pair of left and right track frames with a traveling crawler wounded thereon. In an inside frame type in which the left and right end portions of a working machine frame (a U-shaped, or a C-shaped frame) mounted with a working machine are respectively located between the left and right main frames and track frames, the working machine frame supporting elements for vertically swingably supporting the aforesaid working frame is provided at the front portions of the main frames. In an outside frame type in which the left and right end portions of the working machine frame are located outside the left and right track frames, the working machine frame supporting elements are provided on the outside of the truck frames.

A steering case, which is internally provided with a steering device and has mounting faces to power plant (a final reduction gear cover and the like) and mounting faces to supporting members for a traveling device (a track frame and the like), is welded to the rear portions of the pair of left and right main frames to be a single-piece structure. The steering case consists of a structure of welded sheet metal, or a work piece of cast steel.

External forces exerted on the blade during operation act on the main frames via the working machine frame and the lift cylinder. Accordingly, the main frames need to have enough strength and rigidity to withstand the external forces, and thus various proposals have been conventionally made regarding the main frame structure for this purpose. As for such a main frame structure, for example, Japanese Utility Model Laid-open No. 2-88877 and Japanese Patent Publication No. 62-24583 have been known.

FIG. 19 is a perspective view showing a main frame structure disclosed in Japanese Utility Model Laid-open No. 2- 88877, and FIG. 20 is a side view showing a situation in which a working machine frame is attached to the main frame. As shown in FIG. 19, a main frame 71 is divided into a pair of main frame front portions 72 and a pair of main frame rear portions 73. A cross bar 74 (hereinafter referred to as a cross member 74) is connected with members 77a, 77b, and 77c which connect a front face plate 75 and a rear face plate 76. The main frame front portions 72 are attached to the front face plate 75 of the cross member 74 in a state in which the main frame front portions 72 are inwardly offset with the width thereof smaller than that of the main frame rear portions 73. On the other hand, the main frame rear portions 73 are attached to the rear face plate 76 of the cross member 74. A working machine bracket 13 is attached to the front face plate 75 of the cross member 74 outside the main frame front portion 72 with bolts. The working machine bracket 13 swingably supports a working machine frame 32 to which a blade 31 is attached, and corresponds to a working machine frame supporting member 13 or 105 (see FIG. 1 or FIG. 15) of the present invention described later. A cylinder bracket 79 is attached on the top face of the main frame rear portion 73 with bolts. The cylinder bracket 79 swingably supports a lift cylinder 34, and corresponds to a lift cylinder supporting member 6 or 106 (see FIG. 1 or FIG. 15) of the present invention described later. An equalizer bar 20 is swingably attached between the front face plate 75 and the rear face plate 76, and the member 77b controls the swinging amount of the equalizer bar 20. The main frame rear portion 73 is constructed of a plate into a box shape.

However, the aforesaid conventional main frame structure and the steering case have the following disadvantages.

(1) An engine, transmission, and various kinds of hydraulic devices and electronic equipment for controlling these devices and the working machine are mounted between the left and right main frames, and these devices and equipment increase in size and component count following the improvement in the various performances and functions of vehicles. Consequently, it is desired to increase the size of the internal width between the left and right main frames. However, if the section of the main frame is constructed into a box shape as in the prior art, or if the plate thickness is increased, the size of the main frame in a width direction is increased, thus causing the disadvantages of increasing the entire width of the vehicle as well as the weight, coupled with an increase in size of the equipment internally provided.

(2) In the invention disclosed in Japanese Utility Model Laid-open No. 2-88877, the cylinder bracket 79 (the lift cylinder supporting element) is provided in the vicinity of the middle of the main frame, specifically on the top of the main frame rear portion 73 which is at the rear of the rear face plate 76 of the cross member 74. The working machine bracket 13 (the working machine frame supporting element) is provided at the lower front portion of the main frame, specifically on the front face plate 75 of the cross member 74 and at the outside of the main frame front portion 72. Accordingly, a horizontal distance L1 (see FIG. 20) between the lift cylinder supporting element and the working machine frame supporting element in side view is larger. As a result, external forces exerted on the blade 31 during operation cause great stress and distortion in the area between the lift cylinder supporting element of the main frame and the working machine frame supporting element, and therefore it is necessary to strengthen this area. However, since the main frame has a structure with a box-shaped section, in order to strengthen the area, the structure is complicated. Thus, it takes longer time to carry out a welding operation, the weight is increased, and the entire width of the vehicle is increased.

(3) The main frame is welded to the steering case provided at the rear portion thereof to be constructed into a single piece, therefore the entire size is considerably large. For this reason, when the mounting faces of the steering case to the power plant, the traveling device, and the like, a large-sized work machine is required, and the operation becomes difficult. In order to avoid the above, if the main frame is welded to the steering case after the completion of the work of each mounting face of the steering case, thermal distortion caused by welding will occur in the steering case. Accordingly, in order to secure working accuracy of the mounting faces, it is necessary to rework the mounting faces. In addition, the steering case, which is a welded structure or a work piece of steel cast, has the disadvantage of having less workability.

SUMMARY OF THE INVENTION

In view of the above disadvantages, an object of the present invention is to provide a main frame structure and a steering case of construction equipment which increases the internal width between left and right main frames without increasing the entire width of a vehicle, reduces the weight, and improves the productivity.

In order to attain the above object, a first aspect of a main frame structure of construction equipment according to the present invention is a main frame structure of construction equipment including a pair of left and right main frames, a cross member coupling the front portions of the pair of left and right main frames, and vertically swingably supporting an equalizer bar for coupling a pair of left and right track frames, and lift cylinder supporting elements rotatably supporting one end of a lift cylinder for raising and lowering a working machine frame mounted with a working machine, and characterized in that the pair of left and right main frames are respectively composed of a straight plate provided along a longitudinal direction of a vehicle body, and in that each of the lift cylinder supporting elements is integrally fixed on the outside in a lateral direction of the vehicle body, of the pair of left and right main frames.

According to the above configuration, the lift cylinder supporting elements are integrally fixed on the outside in the lateral direction of the vehicle body, of the main frames. As a result, external forces applied via the lift cylinder is dispersedly transmitted to the main frames from the side portions, and thereafter transmitted to, for example, an S case and a traveling crawler. Thus the stress generating in the main frames is reduced. Hence the left and right main frames can be respectively formed of a straight plate with a smaller thickness, thus simplifying the structure, and reducing the weight of the vehicle and the number of man hours needed for welding. In addition, when the internal width between the left and right main frames is equal to that in the prior art, the external width can be reduced compared to that in the prior art (the box-shaped structure and the large plate thickness), therefore making it possible to reduce the entire width of the vehicle to thereby make the vehicle compact and light.

Further, the lift cylinder supporting element may be formed into a vertical hollow pillar body, and the front end position and the rear end position of the hollow pillar body may be respectively placed almost on a level with a front end face and a rear end face of the cross member in side view.

According to the above configuration, the lift cylinder supporting element is formed to be a vertical hollow pillar body and integrally fixed on the outside of the main frame, with the front end position and the rear end position of the hollow pillar body being respectively placed almost on a level with the front end face and the rear end face of the cross member. Thereby most of external forces exerted via the lift cylinder are received by the hollow pillar bodies and the cross member. The external forces are dispersedly transmitted to the main frames from the side portions via the hollow pillar bodies and the cross member, and further transmitted to the S case and the traveling crawler. Thus the stress generating in the main frames is reduced. Hence the left and right main frames can be respectively formed of a straight plate with a smaller thickness, thus simplifying the structure, and reducing the vehicle weight and the number of man hours needed for welding. In addition, when the internal width between the left and right main frames is equal to that in the prior art, the external width can be reduced compared to that in the prior art (the box-shaped structure and the large plate thickness), therefore making it possible to reduce the entire width of the vehicle to thereby make the vehicle compact and light.

Furthermore, a lift cylinder supporting member for rotatably supporting the one end portion of the lift cylinder may be mounted on the upper end portion of the hollow pillar body, and the position of a lift cylinder supporting point of the lift cylinder supporting member may be above the near center position between the respective front end positions and rear end positions of the cross member and the hollow pillar body in side view.

According to the above configuration, the position of the lift cylinder supporting point of the lift cylinder supporting member mounted on the upper end portion of the hollow pillar body is above the near center position between the respective front end positions and rear end positions of the cross member and the hollow pillar boy. As a result, the moment acting on the main frames, which is caused by external forces applied via the lift cylinder, is decreased. Consequently, stress and distortion occurring to the main frames are decreased, thereby making it unnecessary to increase rigidity which the main frames need to have, and thus the thickness of the main frames can be reduced.

Further, the heights in the vertical direction of the main frames at portions where the hollow pillar bodies are integrally fixed may be almost equal to the heights in the vertical direction of the hollow pillar bodies, and the heights in the vertical direction of the main frames at the positions before and after the portions at which the hollow pillar bodies are integrally fixed may be lower than the heights in the vertical direction of the portions at which the hollow pillar bodies are integrally fixed.

According to the above configuration, the heights of the main frames at the portions where the hollow pillar bodies are fixed are almost equal to the heights of the hollow pillar bodies, and thereby external forces exerted on the lift cylinder supporting member are across the entire heights of the hollow pillar bodies to be dispersedly transmitted to the main frames, thus avoiding concentration of stress. In addition, the heights of the main frames before and after the hollow pillar bodies are made lower, thus improving maintainability of a power plant and a control device provided inside and reducing the weight of the vehicle.

Furthermore, the inner face plates of the hollow pillar bodies may be composed of part of the main frames. According to the above configuration, the structure is simplified, thus facilitating the production and reducing the weight.

Further, through-holes for the equalizer bar to pass through may be provided at the lower portions of the hollow pillar bodies. According to the above configuration, the hollow pillar body has the height from the vicinity of the lift cylinder supporting point to below the equalizer bar, thus obtaining sufficient strength for the external forces received via the lift cylinder.

Furthermore, a working machine frame supporting member for swingably supporting the end portion of the working machine frame may be attached to the lower front face of the hollow pillar body to be attachable and detachable in a longitudinal direction.

According to the above configuration, the end portion of the working machine frame is attached to the lower front face of the hollow pillar body, thus extremely reducing the horizontal distance in side view between the position on which external forces act via the lift cylinder and the position on which external forces act via the working machine. For this reason, torsion generated in the main frames by the respective external forces is decreased, and most of the torsion is received by the hollow pillar bodies. Hence, the thickness of the main frames can be made smaller, and the weight of the vehicle can be reduced. The configuration is applicable to an inside frame type working equipment, and since the working machine frame supporting member is attachable and detachable in the longitudinal direction, the working machine can be easily attached and detached by moving the vehicle in the longitudinal direction instead of disassembling the vehicle body or a traveling body, thus improving the maintainability.

Furthermore, a link supporting member, to which one end portion of a link provided between the lift cylinder and the working machine is swingably attached, may be mounted to each of the front faces of the hollow pillar bodies.

According to the above configuration, the link is provided between the lift cylinder and the working machine, and the one end portion is attached to the hollow pillar body, therefore making it applicable to an outside frame type working equipment. Since external forces exerted via the lift cylinder are applied to the hollow pillar body, stress generated in the main frames is reduced, thus making it possible to reduce the plate thickness of the main frames and the weight of the vehicle.

Further, the hollow pillar body may be formed into a box shape from a front face plate, a rear face plate, an outer face plate, and an inner face plate. According to the above configuration, the strength and rigidity of the lift cylinder supporting elements and the working machine frame supporting elements can be enhanced, and the weight thereof can be reduced at the same time with a simple structure.

A second aspect of a main frame structure of construction equipment according to the present invention is a main frame structure of construction equipment including a pair of left and right main frames, a cross member coupling the front portions of the pair of left and right main frames, and vertically swingably supporting an equalizer bar for coupling a pair of left and right track frames, a pair of left and right working machine frame supporting elements each provided in the vicinity of each of the main frames and rotatably supporting one end of a working machine frame mounted with a working machine, a pair of left and right lift cylinder supporting elements each provided in the vicinity of each of the main frames and rotatably supporting one end of a lift cylinder for raising and lowering the working machine, and a steering case provided at the rear portions of the pair of left and right main frames, internally provided with a steering device, and equipped with track frame supporting members and a final reduction gear, and is characterized in that each of the pair of left and right working machine frame supporting elements and the pair of left and right lift cylinder supporting elements is integrally formed on the left and right and fixed on the outside in a lateral direction of a vehicle body, of the main frames.

According to the above configuration, the working machine frame supporting elements and the lift cylinder supporting elements, which are integrally formed, are fixed integrally on the outside faces of the main frames by welding or the like, thus eliminating looseness and clearance apt to occur in fastening bolts, and enabling a simple structure with enhanced rigidity. As a result, simplification of the structure, and the reduction of the weight can be achieved.

A third configuration of a main frame structure of construction equipment according to the present invention is a main frame structure of construction equipment including a pair of left and right main frames, a cross member coupling the front portions of the pair of left and right main frames, and vertically swingably supporting an equalizer bar for coupling a pair of left and right track frames, a pair of left and right working machine frame supporting elements each provided in the vicinity of each of the main frames and rotatably supporting one end of a working machine frame mounted with a working machine, a pair of left and right lift cylinder supporting elements each provided in the vicinity of each of the main frames and rotatably supporting one end of a lift cylinder for raising and lowering the working machine, and a steering case provided at the rear portions of the pair of left and right main frames, internally provided with a steering device, and equipped with track frame supporting members and a final reduction gear, and is characterized in that the steering case is separable from the pair of left and right main frames, and in that the separable pair of left and right main frames are respectively composed of a straight plate provided along a longitudinal direction of a vehicle body, and are mounted with the steering case via a pair of left and right mounting flanges each fixed on each rear end thereof.

According to the above configuration, the steering case is separable from the pair of left and right main frames, therefore making it possible to work and assemble the steering case individually. As a result, the productivity is improved, and each mounting face of the steering case can be worked with higher accuracy. In this situation, the steering case is not welded to the pair of left and right main frames as conventionally, and therefore welding distortion dose not occur. According to the configuration, the steering case is attached, for example, with bolts, thus enabling to maintain the aforesaid working accuracy as it is. The steering case is attached via the pair of left and right mounting flanges respectively fixed at the rear end portions of the pair of left and right main frames, thus making it possible to enhance the rigidity of the rear end portions of the main frames in spite that "the pair of left and right main frames are respectively composed of a straight plate and separable from the steering case".

Each of the working machine frame supporting elements and the lift cylinder supporting elements each integrally formed on the left and right may be formed into a vertical hollow box-shaped pillar body, and the positions of a front end face and a rear end face of the box-shaped pillar body may be almost on a level with the positions of a front end face and a rear end face of the cross member respectively in side view.

According to the above configuration, each of the working machine frame supporting elements and the lift cylinder supporting elements is formed into a hollow box-shaped pillar body, and fixed on the outside face of the main frame, with the positions of the front end and the rear end of the box-shaped pillar body being almost on a level with the front end face and the rear end face of the cross member respectively. As a result, most of the external forces applied via the lift cylinder are received by the box-shaped pillar bodies and the cross member. The external forces are then dispersedly transmitted to the main frames via the box-shaped pillar bodies and the cross member, and thereafter, the external forces are transmitted to the track frames via the steering case provided at the rear portions of the main frames. Consequently, stress generated in the main frames is reduced. Hence, it is possible to reduce the plate thickness of the left and right main frames, thereby simplifying the structure, and reducing the vehicle weight and the number of man hours for welding.

The pair of left and right mounting flanges may form portions external to the separable pair of left and right main frames at least in a lateral direction of the vehicle body, and the left and right external portions thus formed may be respectively attached to the front face of the steering case with bolts.

According to the above configuration, the portions of the mounting flanges on the main frames, which are external to the main frames in the lateral direction of the vehicle body, are longitudinally fastened to the front face of the steering case with bolts. Thereby, on attachment and detachment with bolts, the operation can be performed outside the main frames (specifically, the space between the main frames and a crawler frame), thus reducing interference when approaching the fastening portions. Consequently, the workability is improved, and attachment and detachment are facilitated.

ROPS (roll-over protective structures) mounting seats may be provided at least on the top face of the steering case. According to the configuration, load caused by ROPS is not directly exerted on the main frames, therefore reducing the weight of the main frames.

Further, the steering case may be a single-piece structure composed of nodular graphite cast iron. According to the configuration, excellent cutting workability and the strength are obtained, thus reducing the time taken to perform a work operation.

A steering case of construction equipment according to the present invention is a steering case of construction equipment provided at the rear portions of a pair of left and right main frames, internally provided with a steering device, and equipped with track frame supporting members and a final reduction gear, and is characterized in that the steering case is separable from the pair of left and right main frames and is provided with ROPS mounting seats at least on the top face thereof.

According to the above configuration, the steering case is separable from the main frames, therefore making it possible to work and assemble the steering case individually, thereby making it easy to work each mounting face of the steering case, and eliminating distortion caused by welding as in the prior art. Hence, higher working accuracy can be maintained. Further, at least, the ROPS mounting seats are provided on the top face of the steering case, and therefore load caused by ROPS is not directly applied to the left and right main frames, and thus the strength and the weight of the main frames can be reduced.

BEST MODE FOR CARRYING OUT THE INVENTION

Preferred embodiments in which a main frame structure and a steering case of construction equipment according to the present invention are used will be described in detail with a bulldozer as an example based on the attached drawings.

Figure 1:
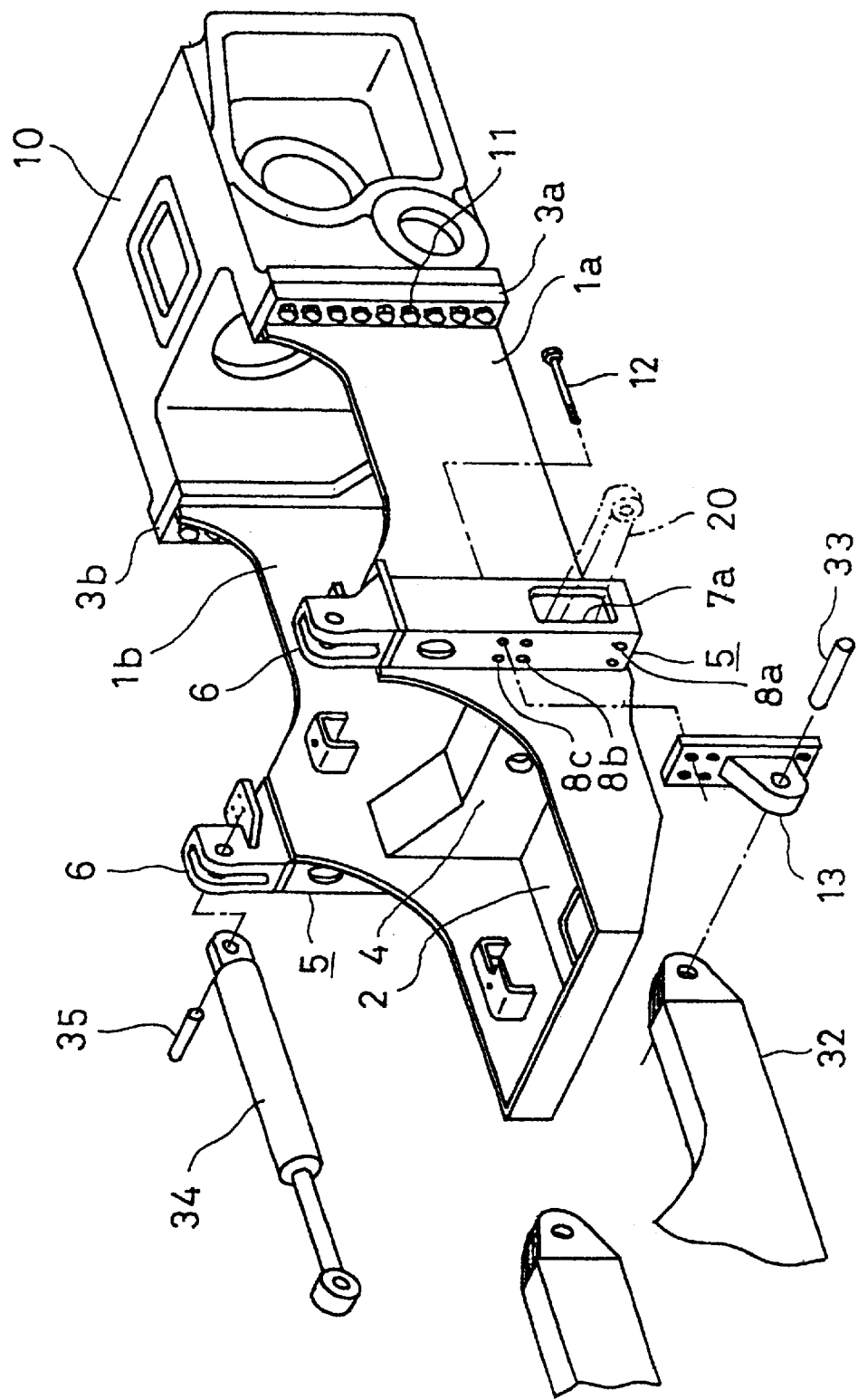
FIG. 1 is a perspective view showing the entire configuration of a main frame of a bulldozer according to the present invention.
Figure 2:
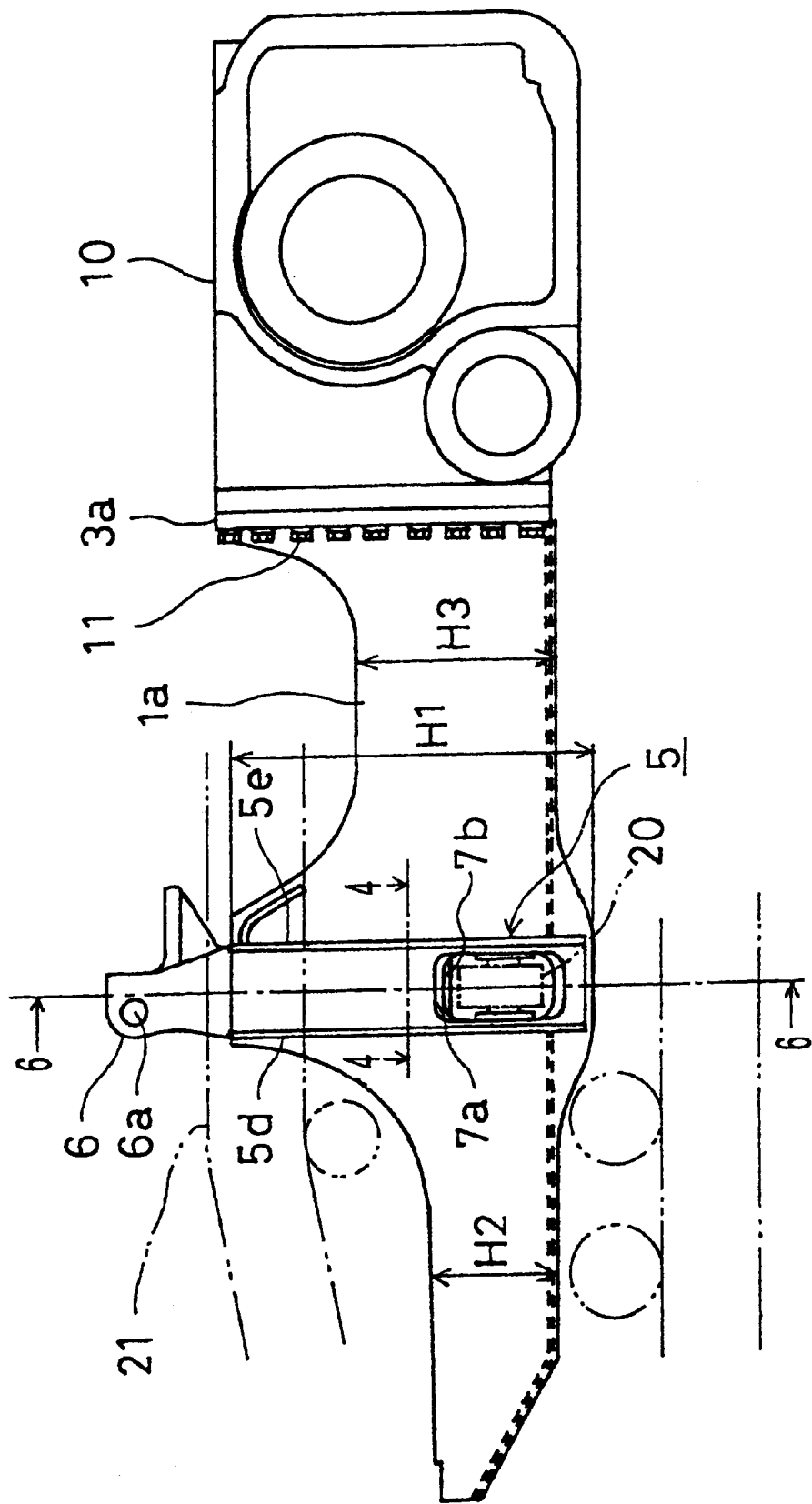
FIG. 2 is a side elevational view of the main frame of the bulldozer according to the present invention.
Figure 3:
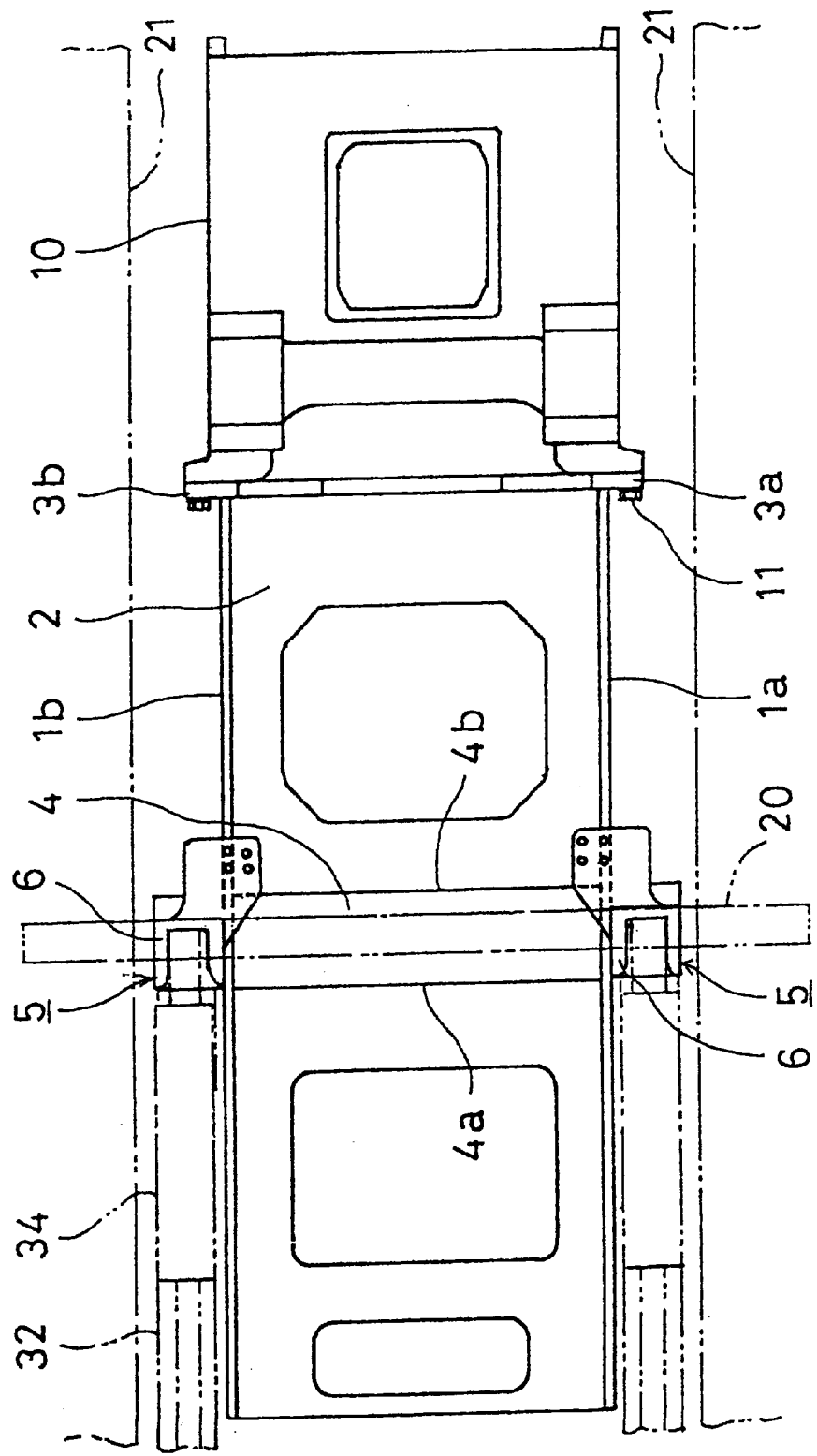
FIG. 3 is a plane view of the main frame of the bulldozer according to the present invention.

A first embodiment will be explained with reference to FIG. 1 to FIG. 14. In FIGS. 1, 2, and 3, a pair of left and right main frames 1a and 1b each consisting of one straight plate are connected with a base plate 2 welded to both lower ends thereof, thereby taking the shape of the bottom of a ship. Flanges 3a and 3b each welded to each rear end of the main frames 1a and 1b are fastened to the front face of a horizontal shaft steering case 10 (hereinafter called the S case 10) with a bolt 11. Nearly to the longitudinal central portions of the main frames 1a and 1b is welded a cross member 4 which rockably supports an equalizer bar 20 connecting a pair of left and right track frames (not shown) and couples the left and right main frames 1a and 1b. The cross member 4 is formed of a sectional U-shaped member with the lower portion thereof being opened, and the lower ends of the U-shaped member are welded to the base plate 2. Hollow pillar bodies 5 and 5 are vertically welded respectively to the outer faces of the left and right main frames 1a and 1b at the position corresponding to the position of the cross member 4 in side view.

Welded to the top of the hollow pillar body 5 is a lift cylinder supporting member 6 for supporting an end at the tube side of a lift cylinder 34 for raising and lowering a working machine. As shown in FIG. 2, a lift cylinder supporting point 6a provided in the lift cylinder supporting member 6 is located higher than the upper face of a traveling crawler 21 (shown by the two-dot line) wound around the track frames (not shown). The lift cylinder supporting point 6a is located between a front end face 5d and a rear end face 5e of the hollow pillar body 5 in side view, and almost directly above the lateral center line of the cross member 4.

Figure 4:
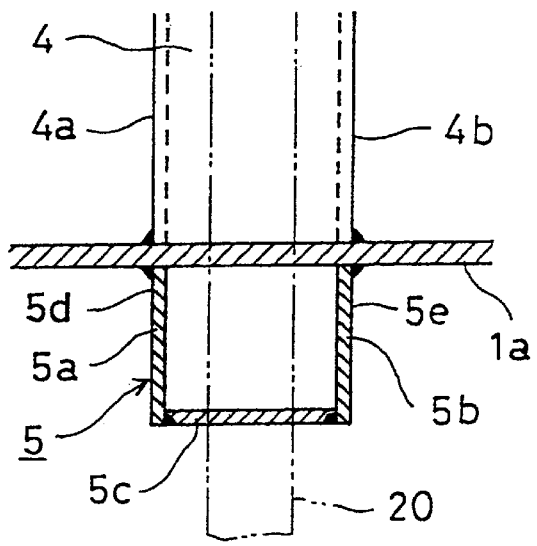
FIG. 4 is a sectional view taken along the 4—4 line in FIG. 2.

In FIG. 4, the hollow pillar body 5 is formed into a quadrangular cross-sectional face by welding a front face plate 5a, a rear face plate 5b, an outer face plate 5c, and the main frame 1a serving also as an inner face plate. FIG. 4 shows only the left hollow pillar body 5 in a traveling direction, but the right one has the same configuration. The main frame 1a corresponds to the main frame 1b in the right hollow pillar body 5. The front end face 5d of the front face plate 5a and the rear end face 5c of the rear face plate 5b are respectively located on a level with a front end face 4a and a rear end face 4b of the cross member 4. The front face plate 5a, the rear face plate 5b, and the outer face plate 5c are respectively composed of separate members, but may be composed of one plate being formed into a U-shaped cross-sectional face.

Figure 5:
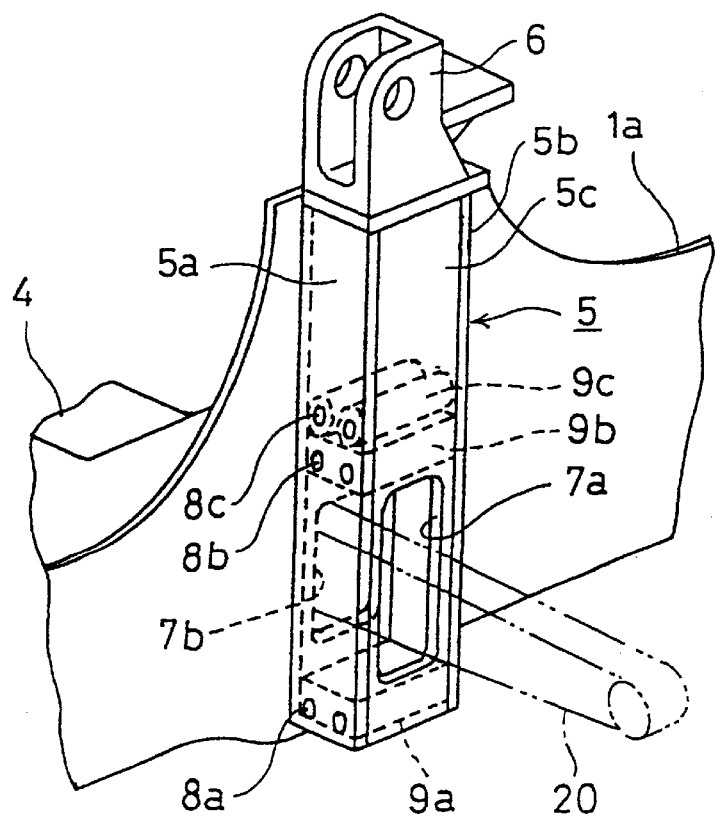
FIG. 5 is a detailed perspective view showing one configurational example of a hollow pillar body according to the present invention.

In FIG. 5, through-holes, through which the equalizer bar 20 connecting the left and right track frames (not shown) and swingably supported at the transversely central portion of the cross member 4 is passed, are provided in both the lower portions of inner and outer sides of the hollow pillar body 5. Specifically, a through-hole 7a is provided in the outer face plate 5c, and a through-hole 7b is provided in the main frame 1a. A first block 9a is fixed lower than the through-hole 7a and between the lower portions of the front face plate 5a and the rear face plate 5b. The predetermined number (for example, two in FIG. 5) of first bolt holes 8a are provided through the front face plate 5a, the rear face plate 5b, and the first block 9a in a longitudinal direction. A second block 9b and a third block 9c are fixed above the through-hole 7a and between the front face plate 5a and the rear face plate 5b. A second bolt hole 8b and a third bolt hole 8c are provided through the second block 9b and the third block 9c respectively as well as through the front face plate 5a and the rear face plate 5b in a longitudinal direction.

Figure 6:
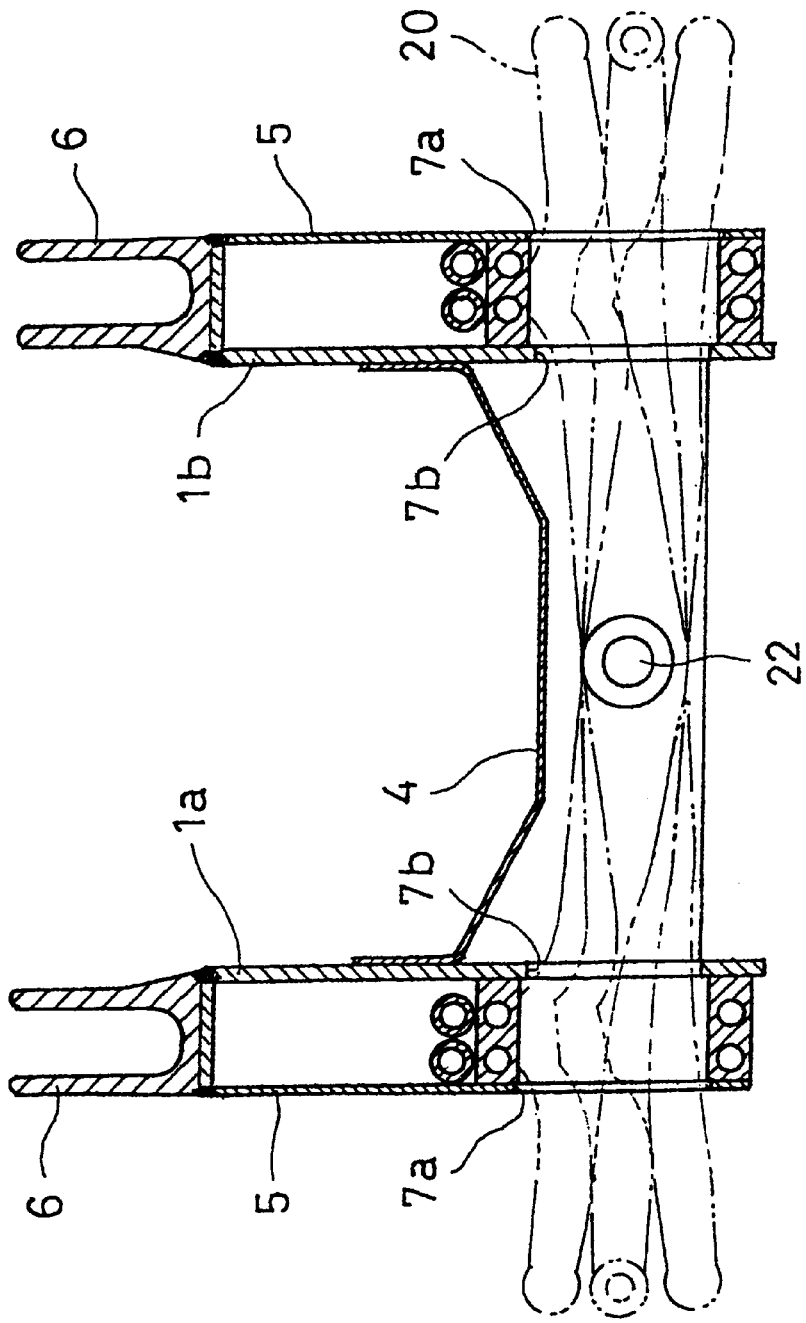
FIG. 6 is a sectional view taken along the 6—6 line in FIG. 2.

As shown in FIG. 6, the equalizer bar 20 is swingably attached to the cross member 4 by a pin 22, and the through-holes 7a and 7b each have a vertical length sufficient for the swing of the equalizer bar 20.

As described above, the hollow pillar body 5 extends over a height from a portion above the traveling crawler 21 to a portion below the equalizer bar 20. As shown in FIG. 2, the height of a welded portion with the hollow pillar body 5 of each of the main frames 1a and 1b is almost the same as a height H1 of the hollow pillar body 5, and heights H2 and H3 of portions in front and behind the aforesaid portion are less than the height H1, thereby sufficiently enhancing the strength of the hollow pillar body 5. In addition, external force applied to the hollow pillar body 5 from the working machine via the lift cylinder 34 is uniformly dispersed and transmitted to the main frames 1a and 1b, thus lowering generated stress in the main frames 1a and 1b. Accordingly, even when the main frames 1a and 1b are each composed of a solid thin plate or the like, they can have sufficient strength, whereby the distance between the main frames 1a and 1b can be increased. As a result, the maintainability of power units and controllers such as an engine, a transmission, and the like which are arranged between the main frames 1a and 1b and not shown are satisfactory, and the weight of the main frames 1a and 1b can be reduced.

Figure 7:
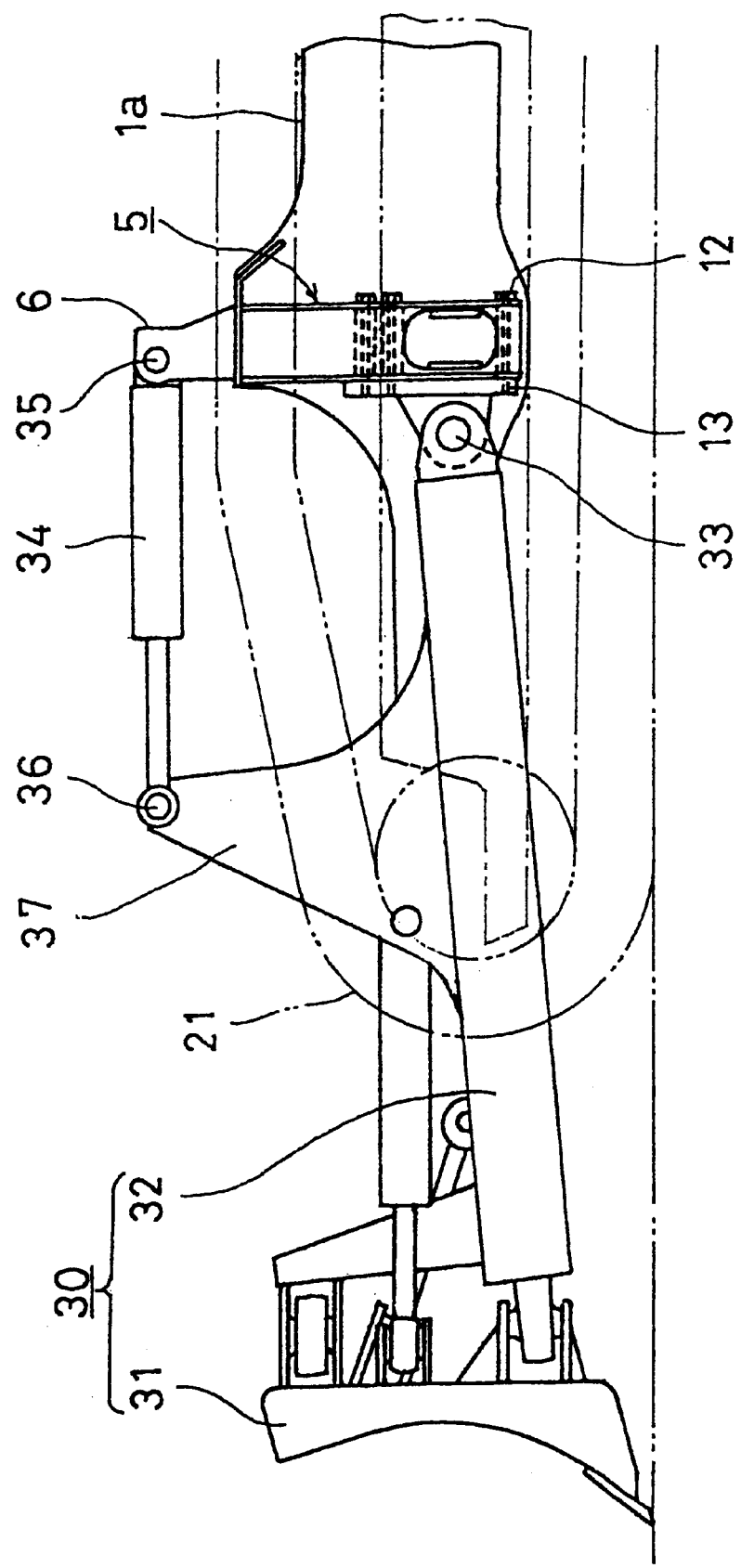
FIG. 7 is a side elevational view showing a state in which an inside frame-type working machine is attached to the main frame according to the present invention.
Figure 8:
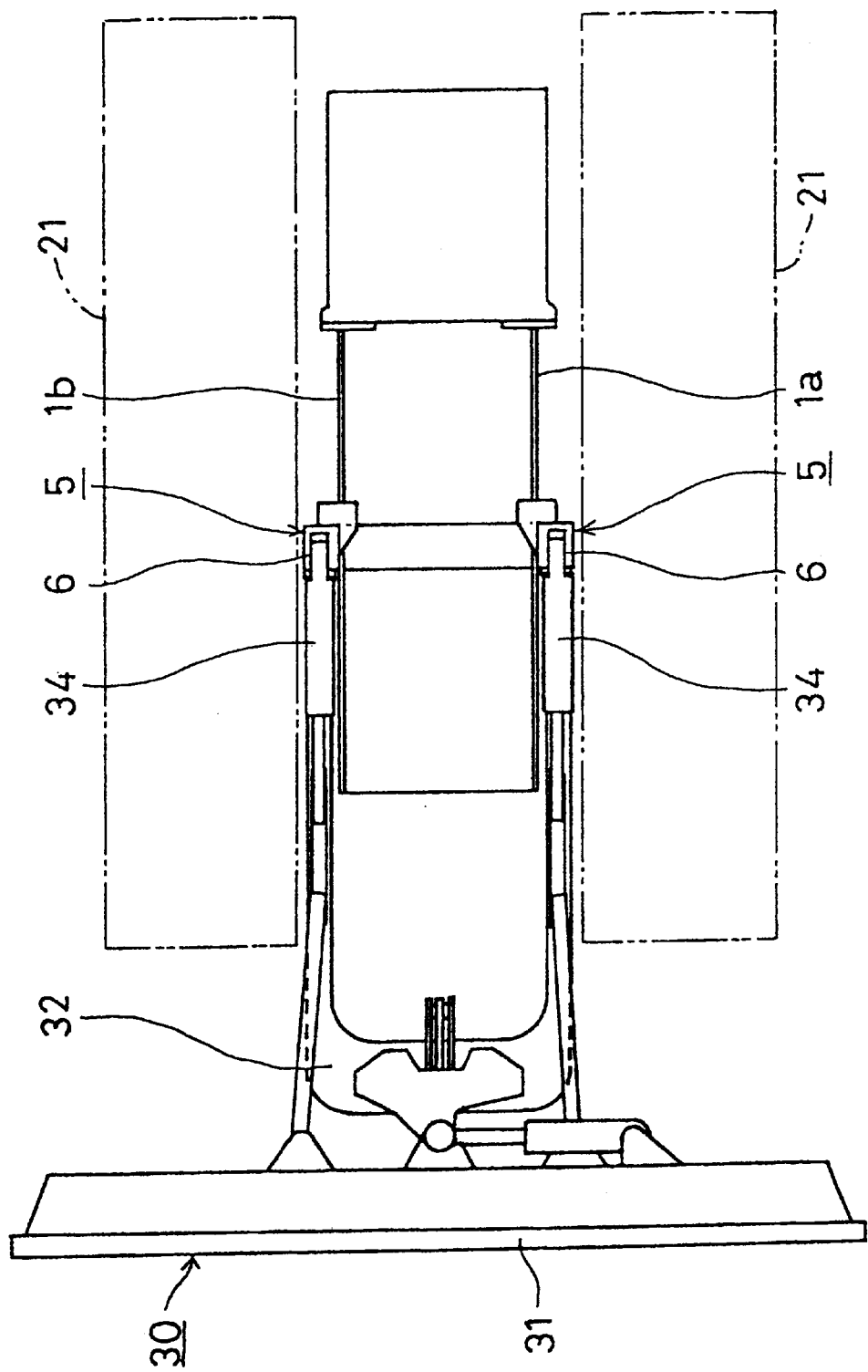
FIG. 8 is a plane view showing the state in which the inside frame-type working machine is attached to the main frame according to the present invention.

A mounting method of an inside frame-type working machine 30 will be explained based on FIG. 7, FIG. 8 and FIG. 1. A working machine frame supporting member 13 is fastened to the lower portion of the front face of the hollow pillar body 5 with plural bolts 12 which respectively pass through the first bolt hole 8a, the second bolt hole 8b, and the third bolt hole 8c from the rear face of the hollow pillar body 5. The rear end of a C-shaped working machine frame 32 with a blade 31 attached to the front portion thereof is vertically swingably attached to the working machine frame supporting member 13 with a connecting pin 33. An end at the tube side of the lift cylinder 34 is vertically swingably attached to the lift cylinder supporting member 6, which is fixed on the top of the hollow pillar body 5, with a pin 35. The other end at the rod side of the lift cylinder 34 is rotatably coupled to a bracket 37, which is provided above the almost center of the C-shaped working machine frame 32, with a pin 36. Thus, when the lift cylinder 34 is extended or shortened, the C-shaped working machine frame 32 vertically swings around the connecting pin 33 to raise or lower the blade 31.

Due to the aforesaid configuration, the mere attachment and detachment of the pin 36 coupling the lift cylinder 34 and the C-shaped working machine frame 32 and the bolts 12 securing the working machine frame supporting member 13 allows the inside frame-type working machine 30 to be attached and detached from the front by moving a vehicle body in a longitudinal direction, thus facilitating attachment and detachment.

Next, the operational effect of a main frame structure of construction equipment in the aforesaid embodiment will be explained.

External force applied to the blade 31 in operation is given to the working machine frame supporting member 13 via the C-shaped working machine frame 32 and to the lift cylinder supporting member 6 via the lift cylinder 34, and further transmitted to the hollow pillar body 5. As described above, the working machine frame supporting member 13 is fastened to the front face of the hollow pillar body 5 with the through-bolts 12. Thus, force applied to the bolts 12 is force in an axial direction, which leads to an advantage in strength and sure transmission of the force to the rear face plate 5b of the hollow pillar body 5, whereby sharing of load is carried out.

The positions of the front end face 5d of the front face plate 5a and the rear end face 5e of the rear face plate 5b of the hollow pillar body 5 are fitted respectively to those of the front end face 4a and the rear end face 4b of the cross member 4 with the main frame 1a and 1b in between. Thereby, the aforesaid external force is transmitted smooth to the cross member 4 via the lower portions of the main frames 1a and 1b. The height of a welded portion with the hollow pillar body 5 of each of the main frames 1a and 1b is the same as the vertical height of the hollow pillar body 5, and the lower ends of the cross member 4 are welded to the base plate 2. Therefore, external force transmitted to the hollow pillar body 5 and the cross member 4 is dispersed and transmitted to the main frames 1a and 1b and the base plate 2, and further transmitted to the S case 10, thus holding down generated stress in the main frames 1a and 1b. Consequently, it becomes possible that even the main frames 1a and 1b each composed of a solid thin plate fully withstand the stress, thus enabling simplification and reduction of weight of the main frame structure.

Figure 9:
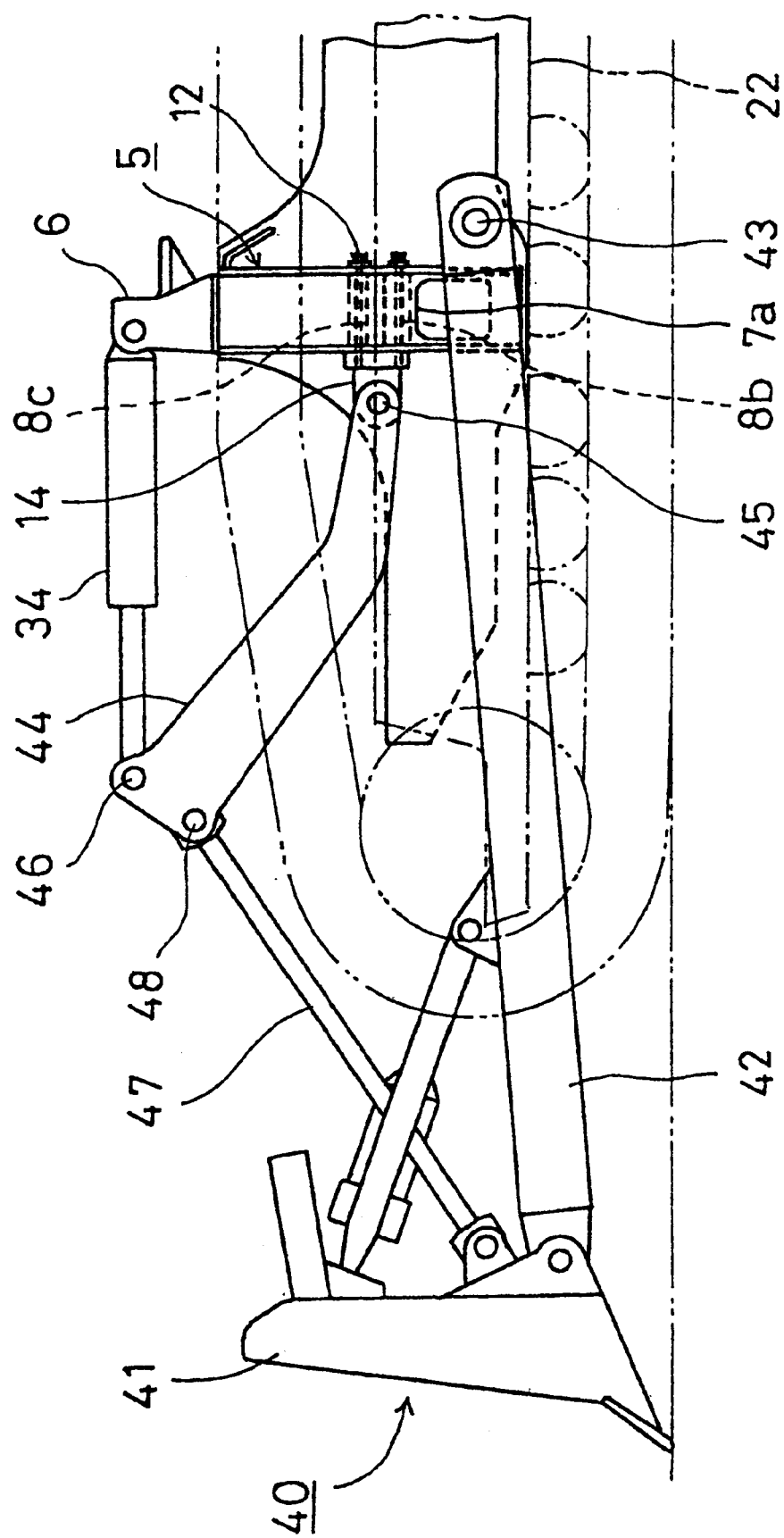
FIG. 9 is a side elevational view showing a state in which an outside frame-type working machine is attached to the main frame according to the present invention.
Figure 10:
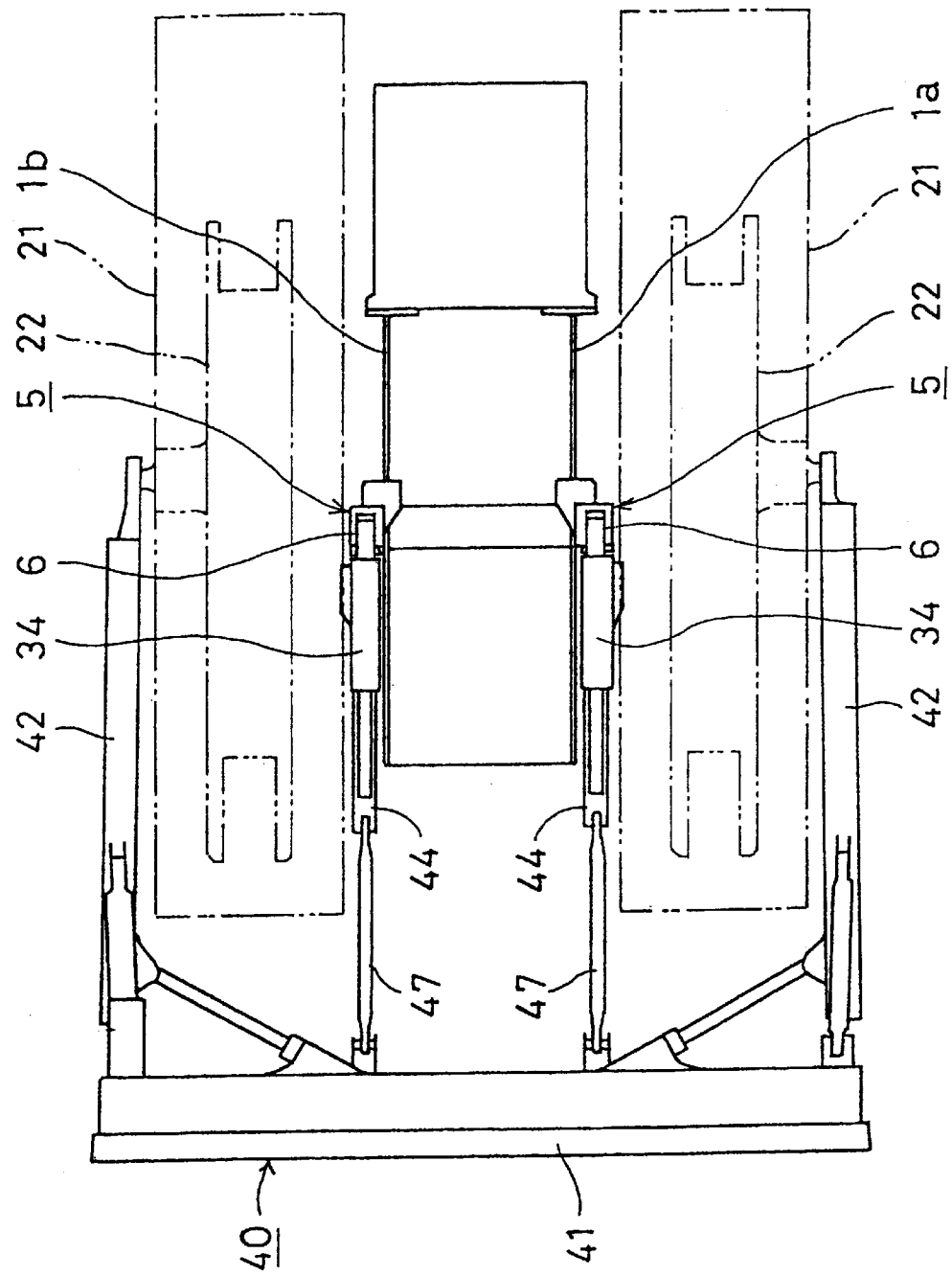
FIG. 10 is a plane view showing the state in which the outside frame-type working machine is attached to the main frame according to the present invention.

Next, a mounting method of an outside frame-type working machine 40 will be explained with reference to FIG. 9 and FIG. 10. A pair of left and right outside frames 42 supporting left and right ends of the blade 41 at the forward ends thereof are each swingably attached to the outer face of the track frame 22 at the rear end thereof with a connecting pin 43. A link supporting member 14 is secured with the bolts 12 in the second bolt hole 8b and the third bolt hole 8c which are provided in the front face of the hollow pillar body 5 and above the through-hole 7a. The base end of a link 44 is rotatably attached to the link supporting member 14.

The lift cylinder 34 is rotatalby attached to the lift cylinder supporting member 6 fixed on the top of the hollow pillar body 5. The forward end of the link 44 is coupled to the rod side end of the lift cylinder 34 with a pin 46 and also coupled to the other end of a rod 47, which is coupled to a blade 41 at one end, with a pin 48. Accordingly, the extension and shortening of the lift cylinder 34 allows the outside frame 42 to vertically swing around the connecting pin 43 via the link 44 to thereby raise or lower the blade 41.

External force in a horizontal direction applied to the blade 41 is transmitted from the outside frame 42 to a track frame 22. Meanwhile, external force applied thereto via the lift cylinder 34 and the link 44 is force in a vertical direction applied to the blade 41, being smaller than that in the horizontal direction. Hence, external force applied to the hollow pillar body 5 is small and generated stress in the main frames 1a and 1b is small. Thus, in this situation, external force from the working machine can be also received by the hollow pillar body 5, which enables each of the main frames 1a and 1b to be composed of a solid thin plate.

As described above, the inside frame-type working machine 30 or the outside frame-type working machine 40 can be selectively mounted to the same main frames 1a and 1b, which is extremely advantageous in the configuration of a vehicle such as commonality of components and the like.

Other configurational examples of the hollow pillar body 5 will be explained below.

Figure 11:
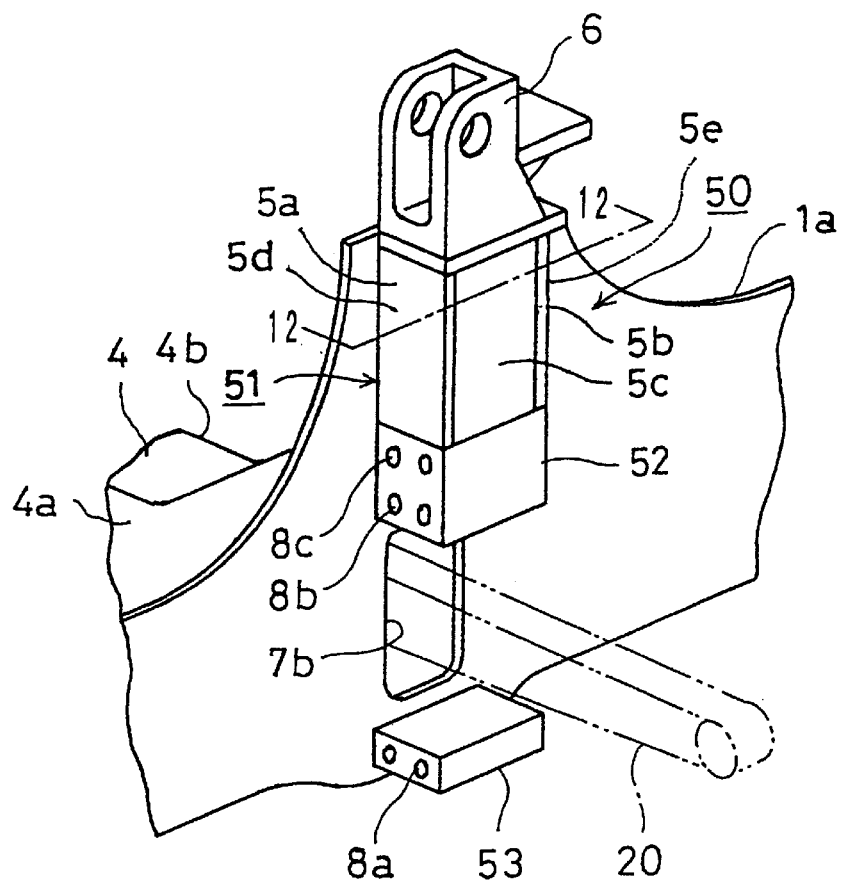
FIG. 11 is a perspective view showing a second configurational example of the hollow pillar body according to the present invention.

FIG. 11 shows a hollow pillar body 50 as a second configurational example in which the through-hole 7a for the equalizer bar 20 in FIG. 1 is omitted. FIG. 11 shows a portion of the left main frame 1a. The hollow pillar body 50 is composed of an upper pillar 51, an intermediate block 52, and a lower block 53. The upper pillar 51 is a quadrangular pillar composed of the front face plate 5a, the rear face plate 5b, the outer face plate 5c, and the main frame 1a (the main frame 1b in the case of the right side), and the lift cylinder supporting member 6 is fixed thereon. The front end face 5d of the front face plate 5a and the rear end face 5e of the rear face plate 5b are respectively located on a level with the front end face 4a and the rear end face 4b of the cross member 4.

The intermediate block 52 is fixed on the lower end of the upper pillar 51 and above the through-hole 7b provided in the main frame 1a, and the second bolt hole 8b and the third bolt hole 8c are provided through the intermediate block 52 in a longitudinal direction. The lower block 53 is fixed below the through-hole 7b of the main frame 1a, separated from the intermediate block 52, and the first bolt hole 8a is provided through the lower block 53 in the longitudinal direction. The working machine frame supporting member 13 (See FIG. 7) is secured through the first bolt hole 8a, the second bolt hole 8b, and the third bolt hole 8c. The link supporting member 14 (See FIG. 9) is secured through the second bolt hole 8b and the third bolt hole 8c.

In the second configurational example, the through-hole 7a (See FIG. 1) is not provided in the hollow pillar body 50 as described above, thus simplifying the structure.

Figure 12:
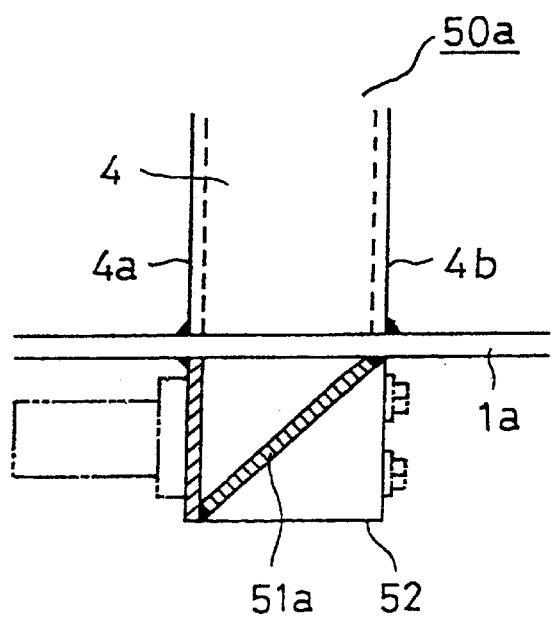
FIG. 12 is a sectional view showing a third configurational example of the hollow pillar body according to the present invention.

FIG. 12 shows a hollow pillar body 50a formed into a triangular pillar as a third configurational example. FIG. 12 shows a section of an upper pillar 51a at a position which corresponds to the position of a section taken along the 12—12 line in FIG. 11. The upper pillar 51a is formed into a triangular pillar with the height thereof being along a vertical direction. One side face of the triangular pillar is composed of the main frame 1a (or the main frame 1b), and the other two side faces thereof are composed of two plates, three of them being fixed to one another by welding. It should be mentioned that one plate may be bent into a triangular pillar-shape to be fixed to the main frames 1a and 1b by welding. The front end face of the upper pillar 51a is on a level with the front end face 4a of the cross member 4, and the rear end portion of the upper pillar 51a is located on a level with the rear end face 4b of the cross member 4. The intermediate block 52 is fixed on the lower end of the upper pole 51a, and the lower block 53 (not shown) is fixed below the through-hole 7b.

Figure 13:
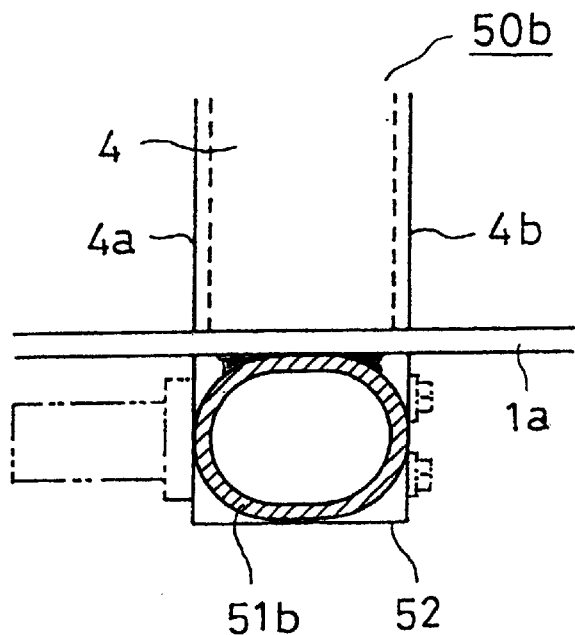
FIG. 13 is a sectional view showing a fourth configurational example of the hollow pillar body according to the present invention.

FIG. 13 shows a cylindrical hollow pillar body 50b as a fourth configurational example. The sectional shape of an upper pillar 51b is nearly circular. The front end and the rear end of the upper pillar 51b are respectively located on a level with the front end face 4a and the rear end face 4b of the cross member 4. The intermediate block 52 is fixed on the lower end of the upper pillar 51b, and the lower block 53 (not shown) is fixed below the through-hole 7b.

Figure 14:
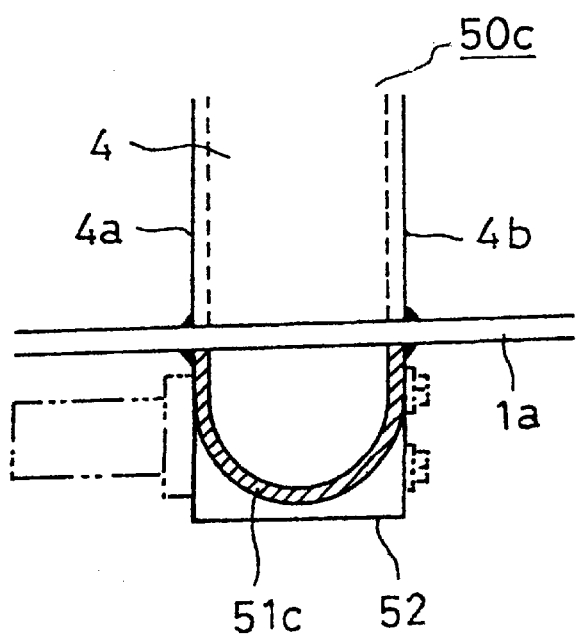
FIG. 14 is a sectional view showing a fifth configurational example of the hollow pillar body according to the present invention.

FIG. 14 shows a hollow pillar body 50c with a semicircular sectional face as a fifth configurational example of the hollow pillar body. The sectional shape of an upper pillar 51c is nearly circular, and the end faces of a semi-cylindrical member formed by bending one plate are fixed to the main frames 1a and 1b by welding. The front end and the rear end of the upper pillar 51c are respectively located on a level with the front end face 4a and the rear end face 4b of the cross member 4. The intermediate block 52 and the lower block 53 are the same as those in the second configurational example. In the aforesaid third to fifth configurational examples, the same operation and effect as in the second configuration example can be obtained.

Next, a second embodiment according to the present invention will be explained with reference to FIG. 15 to FIG. 18.

Figure 15:
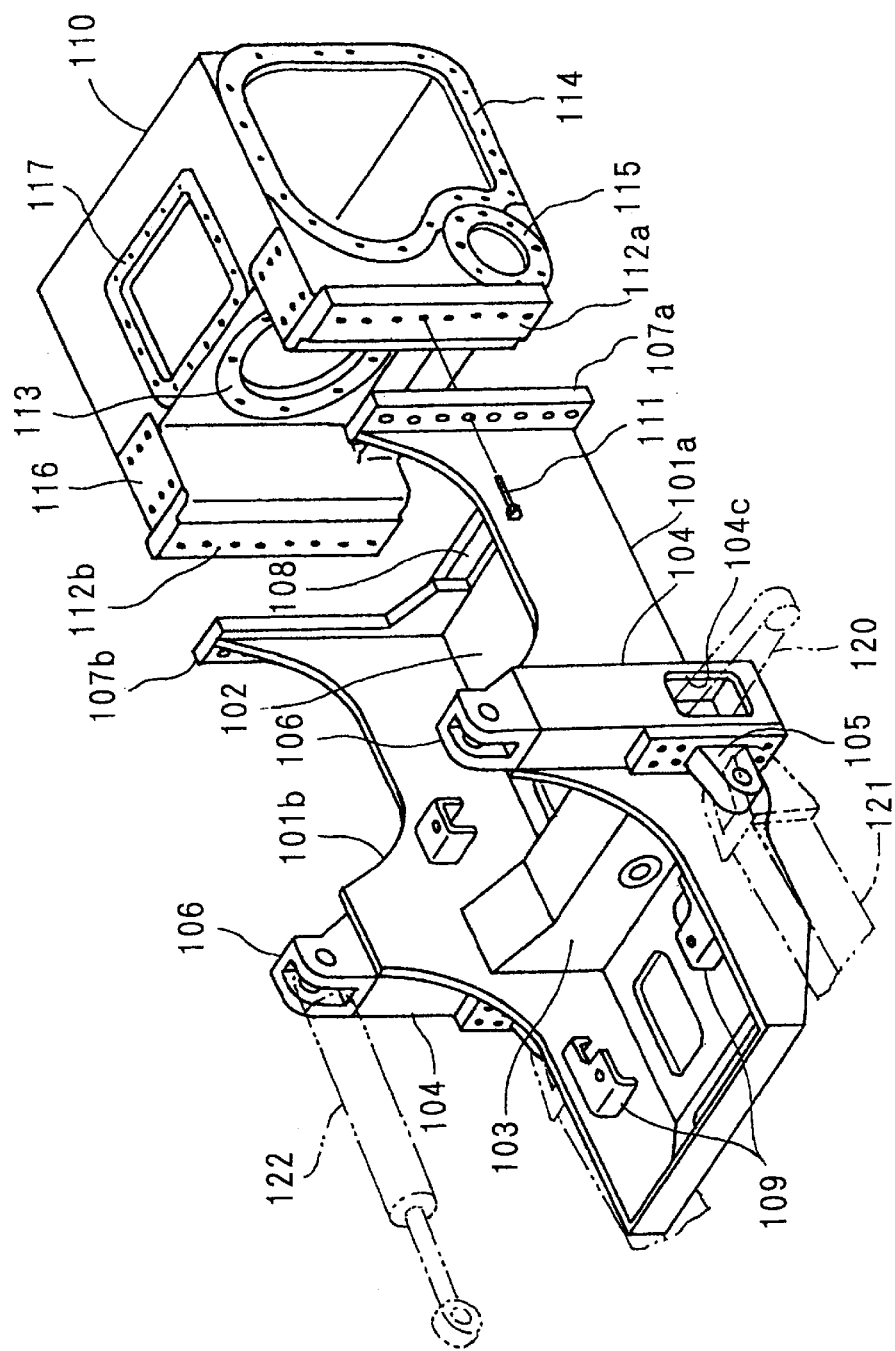
FIG. 15 is a perspective view showing the configurations of a main frame and a steering case of the present invention.
Figure 16:
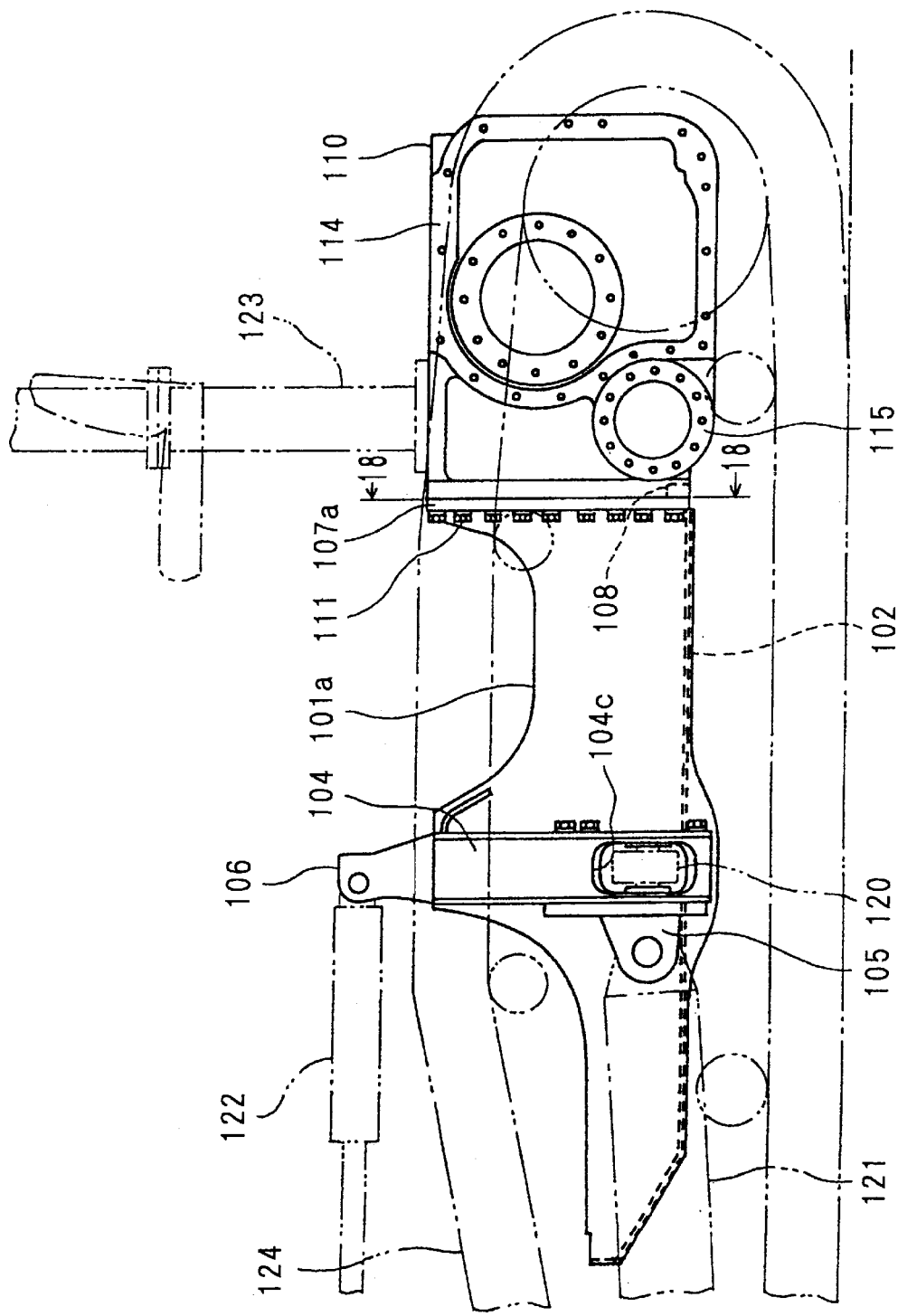
FIG. 16 is a side elevational view of the main frame and the steering case of the present invention.
Figure 17:
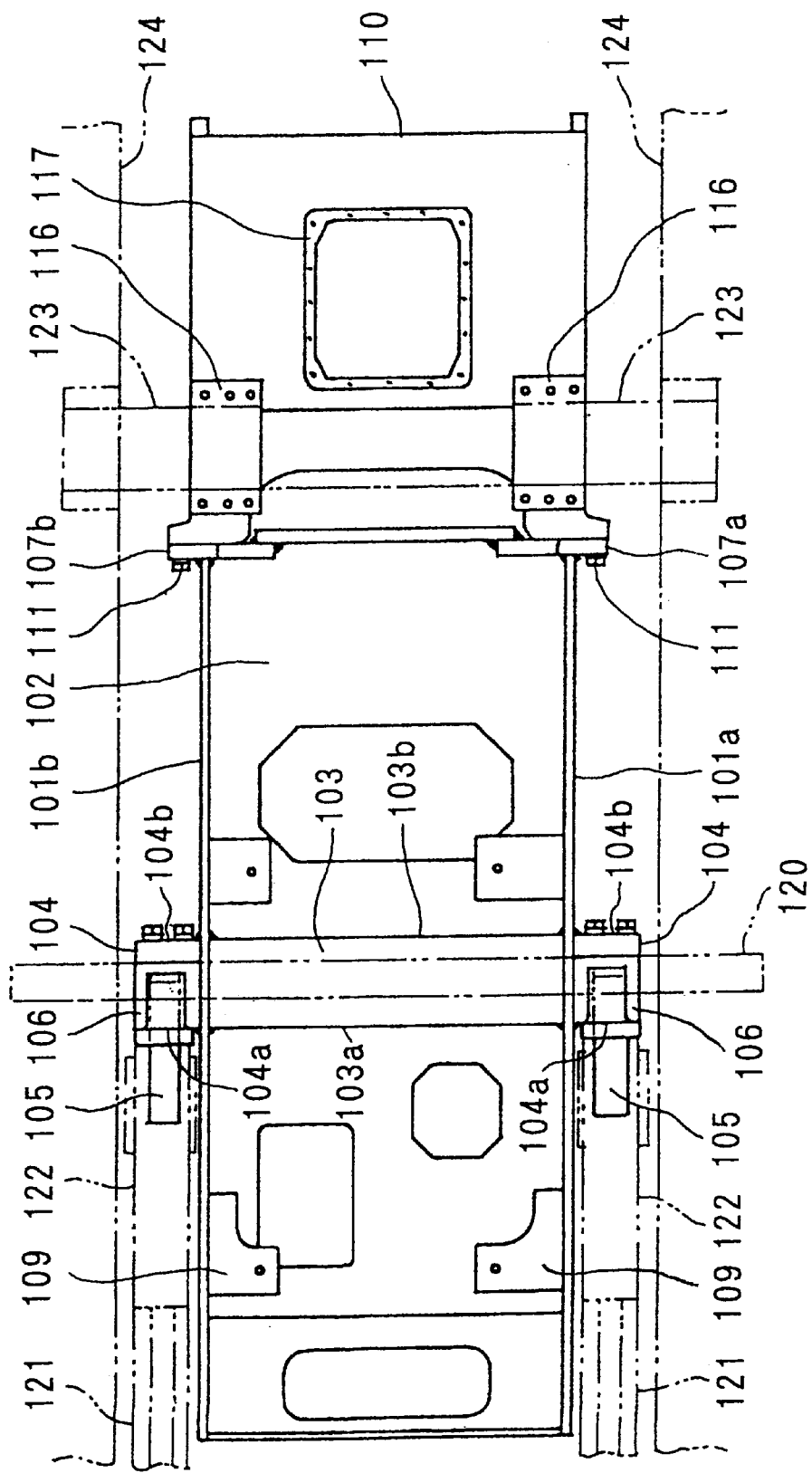
FIG. 17 is a plane view of the main frame and the steering case of the present invention.

In FIGS. 15, 16, and 17, a pair of left and right main frames 101a and 101b disposed vertically along the longitudinal direction of the vehicle body and parallel to each other, each consisting of one straight plate, are connected with a base plate 102 welded to both lower ends thereof, thereby taking the shape of the bottom of a ship. In the longitudinally almost central portions of the main frames 101a and 101b, a cross member 103 which swingably supports an equalizer bar 120 connecting a pair of left and right track frames (not shown) is welded to the main frames 101a and 101b and the base plate 102. The cross member 103 is formed of a sectional U-shaped member with the lower portion thereof being opened, and the lower ends of the U-shaped member are welded to the base plate 102.

A pair of left and right vertically hollow box-shaped pillar bodies 104 and 104 are welded to the outer faces of the left and right main frames 101a and 101b at positions corresponding to the position of the cross member 103 in side view. As shown in FIG. 16, to each of the front faces of the box-shaped pillar bodies 104 and 104 is attached a working machine frame supporting member 105 for rotatably supporting a working machine frame 121 to which a working machine not shown (a blade in the case of a bulldozer) is attached. On the top of each of the box-shaped pillar bodies 104 and 104 is fixed a lift cylinder supporting member 106 for rotatably supporting one end of a lift cylinder 122 which raises and lowers the working machine, and in the lower portion of the side face thereof is provided a through-hole 104c through which an equalizer bar 120 goes through. The box-shaped pillar body 104 extends over a height from a portion above a traveling crawler 124 to a portion below the equalizer bar 120. The height of a welded portion with the box-shaped pillar body 104 of each of the main frames 101a and 101b is almost the same as that of the box-shaped pillar body 104. As shown in FIG. 17, the front end faces 104a and 104a of the box-shaped pillar bodies 104 and 104 are aligned with the front end face 103a of the cross member 103, while the rear end faces 104b and 104b of the box-shaped pillar bodies 104 and 104 are aligned with the rear end face 103b of the cross member 103.

The center of rotation, at which the lift cylinder supporting member 106 supports the lift cylinder 122, is located between the front end face 104a and the rear end face 104b of the box-shaped pillar body 104, and located above the near center line in the lateral direction of the cross member 103 in side vies.

At the rear end of the main frames 101a and 101b are welded a pair of left and right mounting flanges 107a and 107b to be mounted to a steering case 110 internally provided with steering devices not shown (clutches for left and right final reduction gears/a braking device and the like). The mounting flange 107a and 107b are fastened to the front face of the steering case 110 to be attachable/detachable in the longitudinal direction with plural bolts 111. Specifically, the main frames 101a and 101b are separable from the steering case 110. It should be noted that the fastening positions of the bolts 111 are located externally in the lateral direction to the main frames 101a and 101b, therefore increasing the operability in attachment and detachment.

As shown in FIG. 15, main frame mounting seats 112a and 112b for the main frames 101a and 101b to be mounted to, and a transmission mounting seat 113 for a transmission (not shown) to be mounted to are provided on the front face of the steering case 110. Final reduction gear mounting seats 114 for a final reduction gear (not shown) to be mounted to, and pivot shaft mounting seats 115 for a pivot shaft supporting a track frame to be mounted to are provided on the left and right side faces of the steering case 110. ROPS mounting seats 116 for ROPS 123 (see FIG. 16) to be mounted to, which are structures (so-called ROPS) for protecting an operator in case of the vehicle rolling over, and a steering case cover mounting seat 117 are provided on the top face of the steering case 110. Further, a mounting seat (not shown) for an attachment (not shown) to be mounted to and the like is provided on the back face of the steering case 110.

Figure 18:
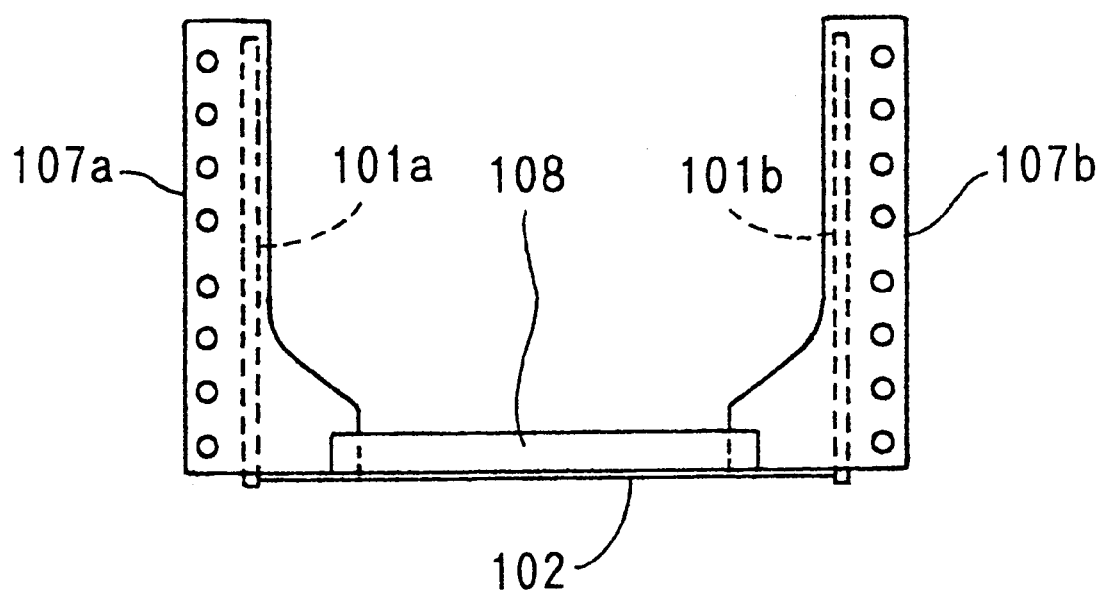
FIG. 18 is a view seen from the arrows 18—18 in FIG. 16.
Figure 19:
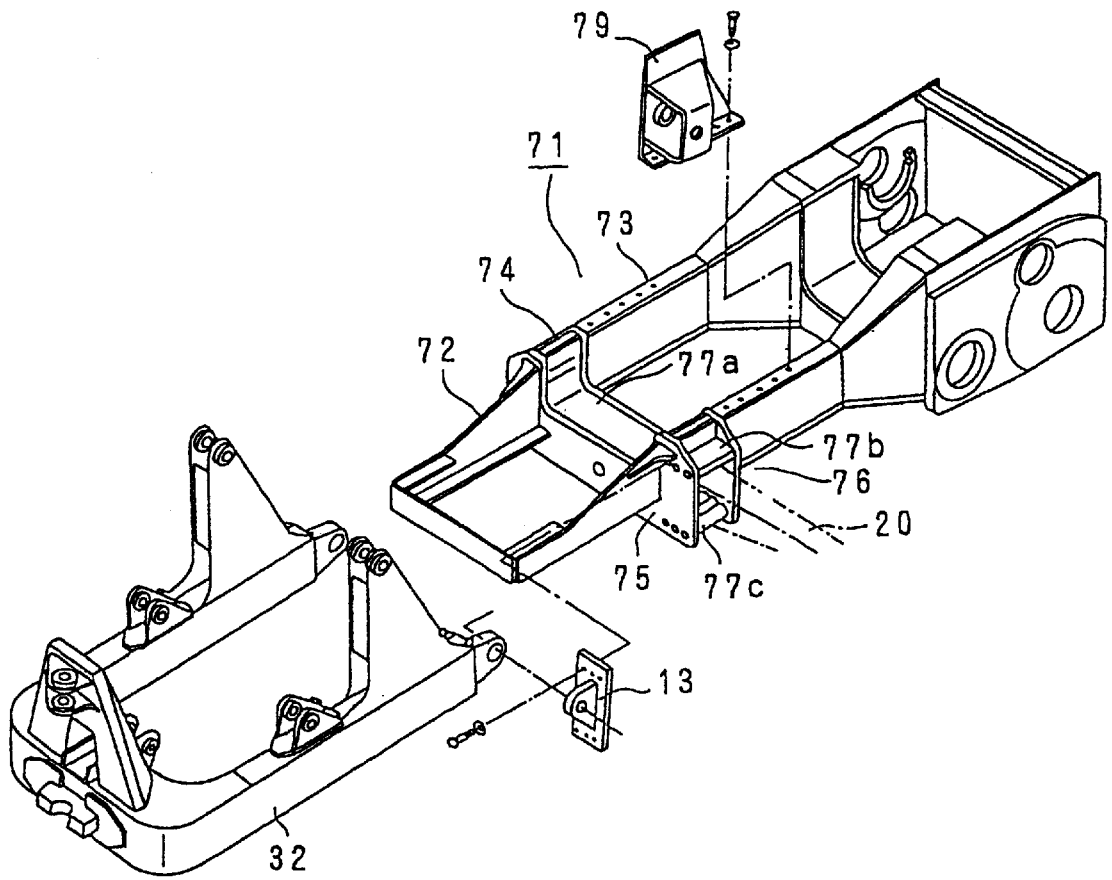
FIG. 19 is a perspective view showing a main frame structure according to the prior art.
Figure 20:
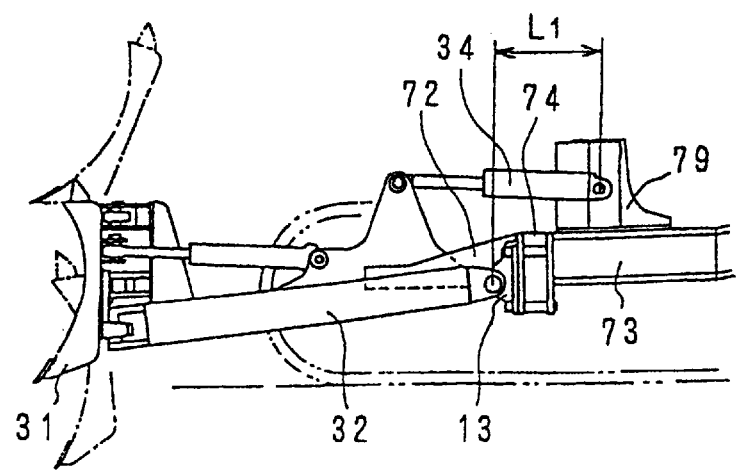
FIG. 20 is a side elevational view showing a state in which a working machine frame is attached to a main frame in FIG. 19.

FIG. 18 is a view of the rear end faces of the main frames 101a and 101b, showing the mounting faces to the steering case 110. The lower end portions of the pair of left and right mounting flanges 107a and 107b welded to the rear ends of the main frames 101a and 101b are connected by welding the connecting member 108 thereto.

As described above, the box-shaped pillar body 104 with the working machine frame supporting member 105 and the lift cylinder supporting member 106 being attached thereto is welded on the outsides of the main frames 101a and 101b and at the position where the front end face 104a and the rear end face 104b are respectively located at the same position as the front and rear end faces 103a and 103b of the cross member 103. According to the configuration, external forces, which are exerted on the working machine frame supporting member 105 and the lift cylinder supporting member 106 during operation, are mostly received by the box-shaped pillar body 104 and the cross member 103. As a result, the external forces are dispersedly transmitted to the main frames 101a and 101b, and the base plate 102 via the box-shaped pillar body 104 and the cross member 103, thus reducing the stress occurring to the main frames 101a and 101b.

Consequently, the main frames 101a and 101b are capable of sufficiently enduring even if each of them is made of a solid thin plate. As a result of making the thickness of the plate thinner, the internal width is increased, thereby making it unnecessary to increase the entire width of the vehicle even if whatever is provided therein increases in size. The connecting member 108 is provided at the rear ends of the main frames 101a and 101b, and the main frames 101a and 101b are connected to the steering case 110 via the mounting faces of the mounting flanges 107a and 107b, therefore increasing the rigidity in this portion and easily securing finishing accuracy.

The steering case 110 is provided with the main frame mounting seats 112a and 112b and the transmission mounting seat 113 on the front face, the final reduction gear mounting seats 114 and the pivot shaft mounting seats 115 on the left and right side faces, the ROPS mounting seats 116 and the steering case cover mounting seat 117 on the top face, and the mounting seat for the attachment to be mounted on the rear face. As described above, the worked portions are concentrated on the steering case 110, and these mounting seats are placed in parallel with, or perpendicularly to one another, therefore facilitating the work, and enabling to finish with higher accuracy. In addition, the steering case 110 is a single-piece casting of nodular graphite cast iron, and has excellent cutting workability. Further, the main frames 101a and 101b, and the steering case 110 are assembled with the bolts 111, therefore securing each finishing accuracy without having effects of welding distortion and the like during assembly. Furthermore, the steering case 110 is individually worked as described above separately from the main frames 101a and 101b, therefore facilitating to handle it during a work operation. Accordingly, productivity can be improved as a whole.

Further, the ROPS mounting seats 116 are provided on the top face of the steering case 110, which eliminates a load directly exerted on the main frames 101a and 101b from the ROPS 123, and thereby the strength and the weight of the main frames 101a and 101b can be reduced.

What is claimed is:

1. A main frame structure of construction equipment, comprising: left and right main frames; a cross member coupling front portions of said left and right main frames, and swingably supporting an equalizer bar; and lift cylinder supporting elements rotatably supporting one end of a lift cylinder for raising and lowering a working machine frame mounted with a working machine, wherein each of said left and right main frames is a straight plate provided along a longitudinal direction of a vehicle body, wherein each of said lift cylinder supporting elements is integrally fixed in a lateral direction of the vehicle body, of said left and right main frames, and wherein each lift cylinder supporting element is mounted onto a hollow vertical pillar body.

2. The main frame structure of the construction equipment in accordance with claim 1, wherein a front end position and a rear end position of said hollow pillar body are respectively placed substantially on a level with a front end face and a rear end face of said cross member taken along a side view.

3. The main frame structure of the construction equipment in accordance with claim 2, wherein a lift cylinder supporting member for rotatably supporting one end portion of said lift cylinder is mounted on an upper end portion of said hollow pillar body, and wherein the position of a lift cylinder supporting point of said lift cylinder supporting member is above the near center position between the respective front end positions and rear end positions of said cross member and said hollow pillar body taken along a side view.

4. The main frame structure of the construction equipment in accordance with claim 2, wherein the heights in the vertical direction of said main frames at portions where said hollow pillar bodies are integrally fixed are almost equal to the heights in the vertical direction of said hollow pillar bodies, and wherein the heights in the vertical direction of said main frames at the positions before and after the portions at which said hollow pillar bodies are integrally fixed are lower than the heights in the vertical direction of the portions at which said hollow pillar bodies are integrally fixed.

5. The main frame structure of the construction equipment in accordance with claim 2, wherein the inner face plates of said hollow pillar bodies are composed of part of said main frames.

6. The main frame structure of the construction equipment in accordance with claim 5, wherein said hollow pillar body is formed into a box shape from a front face plate, a rear face plate, an outer face plate, and an inner face plate.

7. The main frame structure of the construction equipment in accordance with claim 2, wherein through-holes for said equalizer bar to pass through are provided at the lower portions of said hollow pillar bodies.

8. The main frame structure of the construction equipment in accordance with claim 2, wherein a working machine frame supporting member for swingably supporting the end portion of said working machine frame is attached to the lower front face of said hollow pillar body to be attachable and detachable in a longitudinal direction.

9. The main frame structure of the construction equipment in accordance with claim 2, wherein a link supporting member, to which one end portion of a link provided between said lift cylinder and said working machine is swingably attached, is mounted to the front face of said hollow pillar body.

10. The main frame structure of the construction equipment in accordance with claim 2, wherein said hollow pillar body is formed into a box shape from a front face plate, a rear face plate, an outer face plate, and an inner face plate.

11. A main frame structure of construction equipment including left and right main frames, a cross member coupling front portions of said left and right main frames, and vertically swingably supporting an equalizer bar, left and right working machine frame supporting elements each provided in a vicinity of each of said main frames and rotatably supporting one end of a working machine frame mounted with a working machine, left and right lift cylinder supporting elements each provided in the vicinity of each of said main frames and rotatably supporting one end of a lift cylinder for raising and lowering said working machine, and a steering case provided at rear portions of said left and right main frames, internally provided with a steering device, wherein each of said left and right working machine frame supporting elements and said left and right lift cylinder supporting elements are integrally formed and fixed in a lateral direction of a vehicle body, of said main frames, and wherein each of said working machine frame supporting elements and lift cylinder supporting elements are mounted onto a vertical hollow box-shaped pillar body.

12. The main frame structure of the construction equipment in accordance with claim 11, wherein the positions of a front end face and a rear end face of said box-shaped pillar body are almost on a level with the positions of a front end face and a rear end face of said cross member respectively in side view.

13. The main frame structure of the construction equipment in accordance with claim 12, wherein ROPS (roll-over protecting structures) mounting seats are provided at least on the top face of said steering case.

14. The main frame structure of the construction equipment in accordance with claim 12, wherein said steering case is a single-piece structure composed of nodular graphite case iron.

15. A main frame structure of construction equipment including left and right main frames, a cross member coupling front portions of said left and right main frames, and vertically swingably supporting an equalizer bar, left and right working machine frame supporting elements each provided in a vicinity of each of said main frames and rotatably supporting one end of a working machine frame mounted with a working machine, left and right lift cylinder supporting elements each provided in the vicinity of each of said main frames and rotatably supporting one end of a lift cylinder for raising and lowering said working machine, and a steering case provided at rear portions of said left and right main frames, internally provided with a steering device, wherein said steering case is removably coupled to said left and right main frames, and wherein said separable left and right main frames are respectively composed of a straight plate provided along a longitudinal direction of a vehicle body, and are mounted with said steering case via left and right mounting flanges each fixed on each rear end thereof.

16. The main frame structure of the construction equipment in accordance with claim 15, wherein said pair of left and right mounting flanges form portions external to said separable pair of left and right main frames at least in a lateral direction of the vehicle body, and the left and right external portions thus formed are respectively attached to the front face of said steering case with bolts.

17. The main frame structure of the construction equipment in accordance with claim 15;

wherein ROPS (roll-over protecting structures) mounting seats are provided at least on the top face of said steering case.

18. The main frame structure of the construction equipment in accordance with claim 15, wherein said steering case is a single-piece structure composed of nodular graphite cast iron.

* * * * *